United States Patent
Boesch et al.

[11] 3,846,439
[45] *Nov. 5, 1974

[54] PROCESS FOR THE PREPARATION OF 3-PHENYL-5-T-BUTYL-2-OXADIAZOLONES

[75] Inventors: Roger Boesch, Vitry sur Seine; André Blind, Villeurbanne, both of France

[73] Assignee: Rhone-Poulenc S.A., Paris, France

[ * ] Notice: The portion of the term of this patent subsequent to Nov. 5, 1991, has been disclaimed.

[22] Filed: Aug. 5, 1970

[21] Appl. No.: 61,461

[30] Foreign Application Priority Data
Apr. 6, 1970  France .............................. 70.12389

[52] U.S. Cl. ............................................ 260/307 A
[51] Int. Cl. ............................................ C07d 85/54
[58] Field of Search .............................. 260/307 A

[56] References Cited
UNITED STATES PATENTS
3,129,222    4/1964    Bicking .............................. 260/240

OTHER PUBLICATIONS
Wagner et al., "Synthetic Organic Chemistry", John Wiley & Sons, Inc., 1953, page 572.
Morrison et al., "Organic Chemistry", Allyn & Bacon, Inc., 1959, pages 392, 525–526, 570–571.
Parker, A. J., "Advances in Organic Chemistry–Methods and Results", Vol. 5, (1965), pp. 9–10, Interscience Publishers.

Primary Examiner—Raymond V. Rush
Attorney, Agent, or Firm—Stevens, Davis, Miller and Mosher

[57] ABSTRACT

3-(2,4-Dichlorophenyl)-5-t-butyl-1,3,4-oxadiazol-2-ones of the formula:

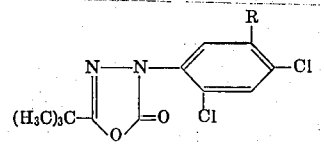

in which R represents a hydrogen atom or an alkoxy group containing one to four carbon atoms, which possess herbicidal properties, are prepared by a new process involving reaction of a halogenonitrobenzene of the formula:

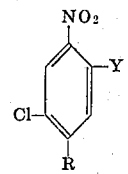

in which Y represents a halogen atom and R is as defined, with an alkali metal salt of 5-t-butyl-1,3,4-oxadiazol-2-one, reduction of the nitro group in the resulting 3-(2-nitro-4-chlorophenyl)-5-t-butyl-1,3,4-oxadiazol-2-one, which may carry an alkoxy substituent R in the 5-position of the benzene ring, to a primary amino group, and replacement of the amino group in the resulting 3-(2-amino-4-chlorophenyl)-5-t-butyl-1,3,4-oxadiazol-2-one by a chlorine atom by reaction of cuprous chloride with a diazomium salt derived from the amino compound. The process avoids the use of phosgene — an awkward reagent hitherto employed in the production of the 3-(2,4-dichlorophenyl)-5-t-butyl-1,3,4-oxadiazol-2-ones.

9 Claims, No Drawings

PROCESS FOR THE PREPARATION OF 3-PHENYL-5-BUTYL-2-OXADIAZOLONES

This invention relates to a new process for the preparation of 3-phenyl-5-t-butyl-2-oxadiazolones.

In the specification of U.S. Pat. No. 3,385,862 granted on May 28, 1968 to J. Metivier and R. Boesch it is disclosed that 3-phenyl-5-t-butyl-2-oxadiazolones of the formula:

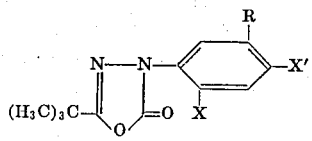

I in which X and X' each represent a halogen atom, and R represents a hydrogen atom or an alkoxy group containing one to four carbon atoms, possess herbicidal properties and are useful for combatting graminaceous and dicotyledonous weeds, for example Panicum, crab-grass, foxtail, pigweed, mayweed and dandelion, in crops such as rice, carrot, cabbage, pea, broad bean and maize. The aforesaid specification describes a process for the preparation of the oxadiazolone compounds which involves the reaction of phosgene with a hydrazide of the formula:

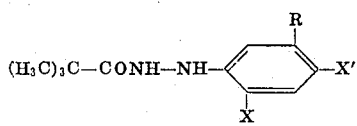

II in which X, X' and R are as hereinbefore defined.

It has now unexpectedly been found that a preferred class of oxadiazolones within the scope of the invention claimed in U.S. Pat. No. 3,385,862, which are the 3-(2,4-dichlorophenyl)-5-t-butyl-2-oxadiazolones of the formula:

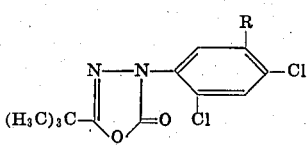

III in which R is as hereinbefore defined, can be prepared by a new process, the object of which is to avoid the use of phosgene—a dangerous toxic substance which can only be employed on an industrial scale provided special installations are utilised and very strict safety measures are applied.

The new process of the present invention for the preparation of the oxadiazolone derivatives of formula III comprises reacting a halogenonitrobenzene of the formula:

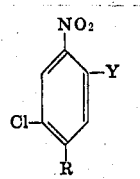

IV in which Y represents a halogen (preferably chlorine) atom and R is as hereinbefore defined, with an alkali metal salt of 5-t-butyl-1,3,4-oxadiazol-2-one of the formula:

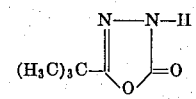

V reducing the nitro group in the resulting product of the formula:

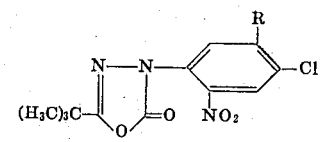

VI in which R is as hereinbefore defined, to a primary amino group by methods known per se and which do not effect the rest of the molecule, converting by methods known per se the amino group in the oxadiazolone derivative thus obtained of the formula:

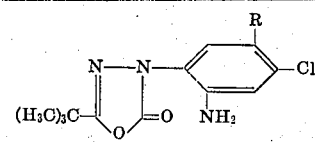

VII in which R is as hereinbefore defined, into a diazonium salt grouping, and reacting the resulting diazonium compound with cuprous chloride to form a 3-(2,4-dichlorophenyl)-5-t-butyl-2-oxadiazolone of formula III. By the term "methods known per se" as used in this specification is meant methods heretofore used or described in the chemical literature.

The reaction of the halogenonitrobenzene of formula IV with an alkali metal salt (preferably the potassium salt) of 5-t-butyl-1,3,4-oxadiazol-2-one is preferably carried out in an aprotic solvent, such as dimethylformamide, dimethylacetamide, hexamethylphosphotriamide, dimethylsulphoxide or N-methyl-pyrrolid-2-one, at a temperature between 50° and 200° C. The alkali metal salt of the oxadiazolone reactant may be prepared in situ.

The nitro group in the intermediate products of formula VI is preferably reduced to a primary amino group by means of iron in a dilute acid (e.g. hydrochloric acid) medium. Reduction of the nitro group can also be effected by catalytic hydrogenation using Raney nickel, or palladium on charcoal, as catalyst.

Conversion of the primary amino group in the oxadiazolone intermediates of formula VII into a diazonium salt grouping can be effected by treatment of the oxadiazolones with an alkali metal nitrite in an acid (e.g. hydrochloric acid) medium at a temperature below 5° C.

The diazonium compounds derived from the oxadiazolones of formula VII are preferably treated with freshly prepared cuprous chloride to replace the diazonium group by chlorine.

The halogenonitrobenzene starting materials of formula IV in which R represents an alkoxy radical containing one to four carbon atoms can be prepared by reaction of an alkali metal alkoxide in an alcoholic medium, optionally in the presence of an alkali metal iodide such as sodium iodide, or by reaction of an alcohol in the presence of an alkali metal hydroxide in a dilute medium, with a benzene compound of the general formula:

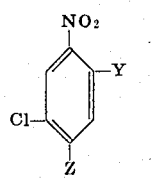

VIII in which Y and Z represent halogen atoms, preferably chlorine atoms. This reaction, the yields of which are improved in the absence of water, generally gives the isomeric products of formula IV and of the formula:

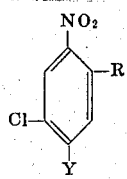

IX in which R and Y are as hereinbefore defined. The isomer of formula IV can be obtained pure by distillation after having removed the isomer of formula IX by crystallisation.

5-t-Butyl-1,3,4-oxadiazol-2-one of formula V can be obtained by reaction of potassium hypobromite in an alkaline medium with trimethylacetylurea.

Alkali metal salts of the oxadiazolone of formula V can be obtained either by reaction of the oxadiazolone with an alkali metal alkoxide, e.g. potassium ethoxide, in alcoholic solution or, in situ, by the action of an alkali metal carbonate, e.g. potassium carbonate, in an organic solvent such as N-methylpyrrolid-2-one.

The process according to the invention enables 3-(2,4-dichlorophenyl)-5-t-butyl-2-oxadiazolones of formula III to be obtained in good yields and from easily accessible starting materials.

The following Example illustrates the process of the present invention.

EXAMPLE a. 5-t-Butyl-1,3,4-oxadiazol-2-one (42.6 g.) and potassium carbonate (20.7 g.) in dimethylformamide (450 cc.) are heated at 90° C. under a pressure reduced to 100 mm.Hg. The water formed during the reaction is removed by distillation at the rate at which it is formed. The reaction is finished after heating for 1 hour 30 minutes, when the potassium carbonate has practically disappeared. After cooling to 70°C., the last traces of carbonate are removed by filtration and 2,5-dichloro-4-isopropoxy-nitrobenzene (75 g.) is added to this solution, and the mixture is heated at 120°C. under a pressure of about 1 bar for 1 hour. After cooling to about 20° C., the reaction mixture is poured, with vigorous stirring, into water (130 cc.). After filtering, washing and drying the precipitate, 3-(2-nitro-4-chloro-5-isopropoxy-phenyl)-5-t-butyl-1,3,4-oxadiazol-2-one (97.8 g.), m.p. 148°C., is isolated. The principal bands in infra-red analysis are: C = O: 5.6 μ;

ArNO₂ : 6.55 μ and 7.5 μ; Ar —O—C : 7.9 μ; C(CH₃)₂₋₃ : 7.2 – 7.3 μ.

b. 3-(2-Nitro-4-chloro-5-isopropoxyphenyl)-5-t-butyl-1,3,4-oxadiazol-2-one (18.95 g.) and a mixture of ethanol (105 cc.), acetic acid (0.5 cc.) and Raney nickel (0.947 g.) are introduced into a 500 cc. autoclave. Hydrogenation is carried out at 80° C. under a pressure of 20 bars (reaction time : 25 minutes). After cooling and flushing the autoclave with nitrogen, the catalyst is removed by filtration. The solvent is evaporated and the solid residue is recrystallised from cyclohexane (100 cc.). 3-(2-Amino-4-chloro-5-isopropoxyphenyl)-5-t-butyl-1,3,4-oxadiazol-2-one (16.5 g.), melting at 86° C., is obtained. The principal bands in the infra-red spectrum are as follows: NH₂ : 2.9 and 3 μ; C = O : 5.65 μ; Ar—O—C : 8.15 μ; C(CH₃)₂₋₃ : 7.2 – 7.3 μ;

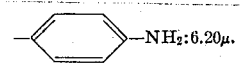

c. The suspension of hydrochloride obtained from 3-(2-amino-4-chloro-5-isopropoxy-phenyl)-5-t-butyl-1,3,4-oxadiazol-2-one (18 g.) and hydrochloric acid (d = 1.18; 36.8 cc.) is treated at 0° C. with a solution of sodium nitrite (4.2 g.) in water (10 cc.), with good stirring. The homogeneous mass is kept at 0° C., with stirring, for 30 minutes and then poured into a solution of cuprous chloride (5.5 g.) in hydrochloric acid (d = 1.18; 14 cc.) and water (14 cc.) at 40° C. After cooling to ambient temperature, the resulting precipitate is filtered off and washed with water until neutral.

After drying to constant weight, the product obtained (17.2 g.) is recrystallised from a water/alcohol mixture containing 20 percent of water to give 3-(2,4-dichloro-5-isopropoxyphenyl)-5-t-butyl-1,3,4-oxadiazol-2-one (14 g.), m.p. 87° C. Its structure is confirmed by infra-red analysis, the principal bands in the infra-red being: C = O : 5.6 μ; C(CH₃)₂₋₃ : 7.2 and 7.3 μ; Ar—O—C : 8 μ.

2,5-Dichloro-4-isopropoxy-nitrobenzene used as starting material can be obtained as follows:

2,4,5-Trichloro-nitrobenzene (45.2 g.) dissolved in isopropanol (50 cc.) is treated with potassium isopropoxide (21.5 g.) in isopropanol (90 cc.) at 50° C., with good stirring (duration of addition : 1 hour). Stirring is continued for a further 30 minutes. After neutralisation with acetic acid, the mixture is cooled. The precipitate thus obtained is filtered off, washed with water and then dried to give 2-isopropoxy-4,5-dichloronitrobenzene (37 g.).

The remainder of the reaction product is subjected to fractional distillation. 2,5-Dichloro-4-isopropoxynitrobenzene (7 g.), b.p. 105° C./0.25 mm.Hg, is thus obtained.

2,4,5-Trichloro-nitrobenzene, m.p. 59°C., can be obtained by direct nitration of 1,2,4-trichlorobenzene.

We claim:

1. Process for the preparation of 3-(2,4-dichlorophenyl)-5-t-butyl-1,3,4-oxadiazol-2-ones of the formula:

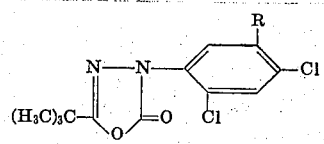

in which R represents hydrogen or alkoxy of one to four carbon atoms, which comprises reacting a halogenonitrobenzene of the formula:

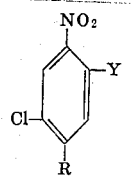

in which Y represents halogen and R is as hereinbefore defined, with an alkali metal salt of 5-t-butyl-1,3,4-oxadiazol-2-one in an aprotic solvent selected from the group consisting of dimethylforamide, dimethylacetamide, hexamethylphosphotriamide, dimethylsulphoxide and N-methyl pyrrolid-2-one, reducing the nitro group in the resulting product of the formula:

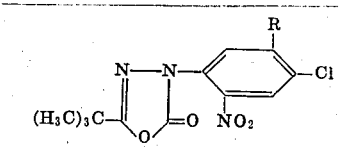

in which R is as hereinbefore defined, to a primary amino group, diazotizing the amino group in the oxadiazolone derivative thus obtained of the formula:

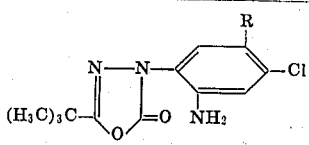

in which R is as hereinbefore defined, and reacting the resulting diazonium compound with cuprous chloride to replace the dizaonium grouping by a chlorine atom.

2. Process according to claim 1 in which Y represents a chlorine atom.

3. Process according to claim 1 in which the potassium salt of 5-t-butyl-1,3,4-oxadiazol-2-one is reacted with the halogenonitrobenzene.

4. Process according to claim 1 in which the reaction between the halogenonitrobenzene and alkali metal salt of 5-t-butyl-1,3,4-oxadiazol-2-one is carried out at a temperature between 50° and 200° C.

5. Process according to claim 1 in which the nitro group of the 3-(2-nitro-4-chlorophenyl)-5-t-butyl-1,3,4-oxadiazol-2-one intermediate is reduced to primary amino by means selected from iron in a dilute acid medium and catalytic hydrogenation.

6. Process according to claim 1 in which the amino group of the 3-(2-amino-4-chlorophenyl)-5-t-butyl-1,3,4-oxadiazol-2-one intermediate is diazotised by treatment with an alkali metal nitrite in an acid medium at a temperature below 5° C.

7. Process according to claim 1 for the preparation of 3-(2,4-dichloro-phenyl)-5-t-butyl-1,3,4-oxadiazol-2-ones of the formula:

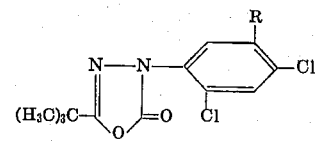

in which R represents hydrogen or alkoxy of one to four carbon atoms, which comprises reacting a halogenonitrobenzene of the formula:

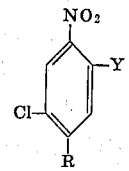

in which Y represents halogen and R is as hereinbefore defined, with an alkali metal salt of 5-t-butyl-1,3,4-oxadiazol-2-one in an aprotic solvent medium at a temperature between 50° and 200° C., reducing the nitro group in the resulting product of the formula:

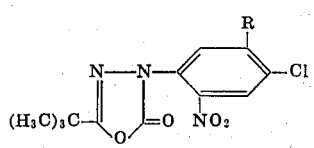

in which R is as hereinbefore defined, to a primary amino group by means selected from iron in a dilute acid medium and catalytic hydrogenation, diazotizing the amino group in the oxadiazolone derivative thus obtained of the formula:

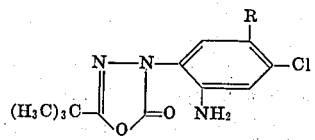

in which R is a hereinbefore defined, by treatment with an alkali metal nitrite in an acid medium at a temperature below 5° C., and reacting the resulting diazonium compound with cuprous chloride to replace the diazonium grouping by a chlorine atom.

8. Process according to claim 7 in which Y is chlorine.

9. Process according to claim 7 in which the potassium salt of 5t-butyl-1,3,4-oxadiazol-2-one is reacted with the halogenonitrobenzene.

* * * * *